(12) United States Patent
Koike (10) Patent No.: US 12,340,206 B2
(45) Date of Patent: Jun. 24, 2025

(54) INFORMATION PROCESSING APPARATUS AND FIRMWARE UPDATE METHOD

(71) Applicant: Kazuma Koike, Kanagawa (JP)

(72) Inventor: Kazuma Koike, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 224 days.

(21) Appl. No.: 18/188,786

(22) Filed: Mar. 23, 2023

(65) Prior Publication Data

US 2023/0333839 A1    Oct. 19, 2023

(30) Foreign Application Priority Data

Apr. 15, 2022   (JP) .................................. 2022-067660

(51) Int. Cl.
*G06F 8/65* (2018.01)

(52) U.S. Cl.
CPC ...................................... *G06F 8/65* (2013.01)

(58) Field of Classification Search
CPC ........................................................ G06F 8/65
USPC ........................................................ 717/168
See application file for complete search history.

(56) References Cited

U.S. PATENT DOCUMENTS

| | | | | |
|---|---|---|---|---|
| 7,814,480 B2* | 10/2010 | Sakuda | ...................... | G06F 8/65 717/173 |
| 8,701,100 B2* | 4/2014 | Jung | ......................... | G06F 8/65 717/170 |
| 9,274,788 B2* | 3/2016 | Yagi | ........................ | G06F 8/656 |
| 9,354,680 B2* | 5/2016 | Kasuya | ...................... | G06F 1/24 |
| 9,678,742 B2* | 6/2017 | Kanematsu | ............... | G06F 8/65 |
| 9,792,107 B2* | 10/2017 | Niwa | ....................... | G06F 8/658 |
| 9,959,125 B2* | 5/2018 | Siluvainathan | ........ | G06F 9/4401 |
| 10,037,203 B1* | 7/2018 | Chavez | ................... | G06F 8/656 |
| 10,841,450 B2* | 11/2020 | Han | ................... | H04N 1/00938 |
| 11,093,184 B2* | 8/2021 | Kim | ........................ | G06F 3/1285 |
| 11,137,956 B2* | 10/2021 | Suzuki | ................... | G06F 3/1225 |
| 11,356,576 B2* | 6/2022 | Watanabe | ............... | G06F 21/31 |
| 11,394,844 B2* | 7/2022 | Han | ................... | H04N 1/00854 |
| 11,831,830 B2* | 11/2023 | Hatanaka | ........... | H04N 1/00503 |
| 12,105,790 B2* | 10/2024 | Kamiya | .............. | G06F 9/44505 |
| 2003/0067626 A1 | 4/2003 | Ohmori et al. | | |
| 2008/0301663 A1* | 12/2008 | Bahat | ...................... | G06F 8/656 717/170 |
| 2009/0241099 A1* | 9/2009 | Lee | ........................... | G06F 8/65 717/168 |
| 2010/0186007 A1* | 7/2010 | Jeong | ....................... | G06F 8/60 717/173 |
| 2013/0145141 A1* | 6/2013 | Han | ...................... | G06F 9/4401 713/2 |
| 2013/0174141 A1* | 7/2013 | Hirokawa | ................. | G06F 8/61 717/174 |

(Continued)

FOREIGN PATENT DOCUMENTS

| | | |
|---|---|---|
| JP | 2008-217201 | 9/2008 |
| JP | 2012-160113 | 8/2012 |

(Continued)

*Primary Examiner* — Francisco J Aponte
(74) *Attorney, Agent, or Firm* — IPUSA, PLLC (57) ABSTRACT

An information processing apparatus and a firmware update method. The information processing apparatus updates firmware of the controller, updates the firmware of the operation device while the operation device is in operation, and updates respective firmware concurrently at least a part of time.

6 Claims, 9 Drawing Sheets

(56) References Cited

U.S. PATENT DOCUMENTS

| | | | | |
|---|---|---|---|---|
| 2016/0337544 | A1* | 11/2016 | Han | H04N 1/00973 |
| 2017/0046152 | A1* | 2/2017 | Shih | G06F 11/0727 |
| 2018/0173182 | A1* | 6/2018 | Miller | H04W 4/00 |
| 2018/0267793 | A1 | 9/2018 | Watanabe | |
| 2018/0341434 | A1* | 11/2018 | Han | G06F 3/1221 |
| 2019/0265964 | A1 | 8/2019 | Koike | |
| 2019/0303173 | A1 | 10/2019 | Senda et al. | |
| 2020/0042257 | A1* | 2/2020 | Wang | G06F 3/1204 |
| 2024/0045663 | A1* | 2/2024 | Kim | H04W 4/44 |
| 2024/0248727 | A1* | 7/2024 | Pinto | H04R 1/1041 |

FOREIGN PATENT DOCUMENTS

| | | | |
|---|---|---|---|
| JP | 2016129945 A | * | 7/2016 |
| JP | 2018-156638 | | 10/2018 |
| JP | 2020-021246 | | 2/2020 |
| JP | 2020-191121 | | 11/2020 |

* cited by examiner

INFORMATION PROCESSING APPARATUS AND FIRMWARE UPDATE METHOD

CROSS-REFERENCE TO RELATED APPLICATIONS

This patent application is based on and claims priority pursuant to 35 U.S.C. § 119(a) to Japanese Patent Application No. 2022-067660, filed on Apr. 15, 2022, in the Japan Patent Office, the entire disclosure of which is hereby incorporated by reference herein.

BACKGROUND

Technical Field

The present disclosure relates to an information processing apparatus and a firmware update method.

Background Art

An information processing apparatus such as a multifunction peripheral (MFP) includes multiple functions, executes multiple pieces of firmware for controlling a controller, an operation device, a printer that performs image formation, a facsimile, a finisher, and the like. By updating the firmware in the information processing apparatus used by the user after shipment, the functions of the information processing apparatus can be improved even after shipment.

Techniques for updating multiple pieces of firmware in parallel are known. A technique for simultaneously updating each piece of firmware in parallel and displaying the update processing progress of each piece of firmware in real time is disclosed.

SUMMARY

Embodiments of the present disclosure describe an information processing apparatus and a firmware update method. The information processing apparatus updates firmware of the controller, updates the firmware of the operation device while the operation device is in operation, and updates respective firmware concurrently at least a part of time.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An image forming apparatus and a firmware update method performed by the image forming apparatus is described below as an example of embodiments of the present disclosure with reference to the drawings.

Figure 1:
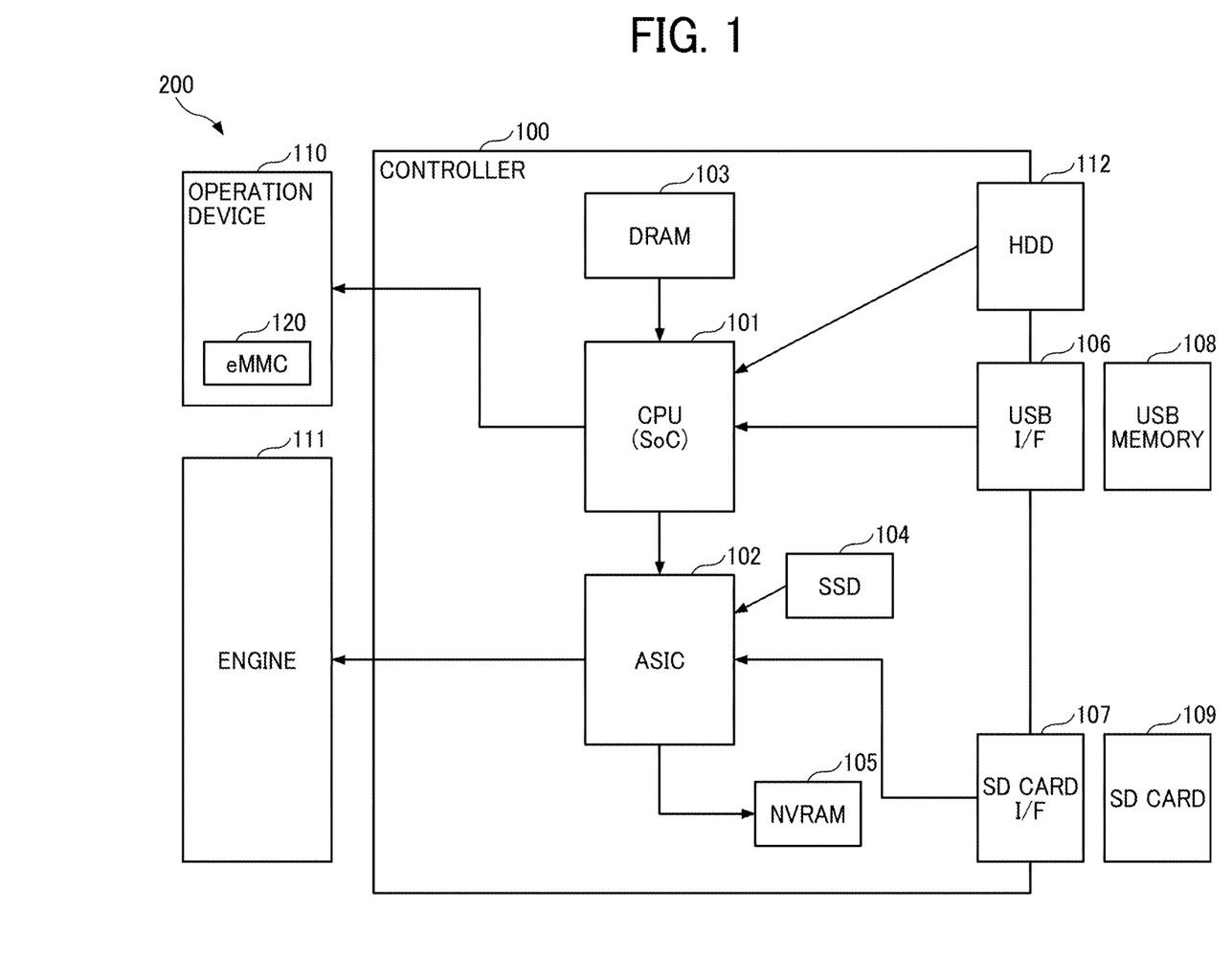
FIG. 1 is a block diagram illustrating an example of a configuration of an image forming apparatus.

With reference to FIG. 1, firmware update methods according to several different procedures are described. FIG. 1 is a block diagram illustrating a configuration of an image forming apparatus 200. The image forming apparatus 200 is entirely controlled by a controller 100. The controller 100 includes a central processing unit (CPU) 101, an application specific integrated circuit (ASIC) 102, a dynamic random access memory (DRAM) 103, a solid state drive (SSD) 104, a non-volatile random access memory (NVRAM) 105, a secure digital (SD) card interface (I/F) 107, a Universal Serial Bus (USB) I/F 106 and a hard disk drive (HDD) 112. An SD card 109 is attached to the SD card I/F 107 and a USB memory 108 is attached to the USB I/F 106.

The controller 100 is connected to an operation device 110 and an engine 111 through serial interfaces such as USB cables. The operation device 110 is implemented by a control panel, which includes a touch panel and a keyboard, displays an operation screen, and receives input from a user. The engine 111 performs processing related to functions of the image forming apparatus 200, such as a print function, a scan function, and a facsimile function. The engine 111 may be referred to as an image forming device capable of forming an image processed by the controller 100, using a print function, a scan function, or a facsimile function.

The operation device 110 includes an embedded Multimedia Card (eMMC) 120 and the controller 100 includes the HDD 112. The eMMC 120 stores an operating system (OS), firmware, and application of the operation device 110. The HDD 112 stores the OS and firmware of the controller 100.

As described above, the operation device 110 and the controller 100 are running firmware on different OSs. The operation device 110 and the controller 100 are devices independent of each other, and the operation device 110 displays the operation screen and receives input from the user independently from the controller 100. The HDD 112 is provided on the controller since the HDD 112 having a large capacity and resistance to failure is preferable for storing data such as print data. On the other hand, since the operation device 110 mainly serves as an interface for the user, the eMMC 120 having excellent reading and writing speed for ensuring operability is preferable. However, the controller 100 may be equipped with the SSD or eMMC, or the operation device 110 may be equipped with the SSD or HDD.

A following first procedure is conceivable in which the image forming apparatus 200 updates the firmware of the operation device 110 and the controller 100, respectively.

(1) The user instructs the controller 100 to update the firmware. The user may instruct update through a network from a terminal device such as a personal computer (PC), or may operate the operation device 110 to instruct the update.

(2) The user copies a compressed file (referred to as a package) including the firmware for the operation device 110 and the controller 100 to the HDD 112. The user may download the compressed file from the network, or copy from the SD card or the like.

(3) The OS of the controller 100 copies the package, and then decompresses and stores the package in the HDD 112.

(4) The OS of the controller 100 updates the firmware of the controller 100 using the decompressed file.

(5) After the update is completed, the OS of the controller 100 transfers the firmware of the operation device 110 and the application from the HDD 112 to the eMMC 120 of the operation device 110.

(6) The operation device 110 first updates the application.

(7) After the application is updated, the operation device 110 restarts in a mode dedicated to updating called a recovery mode (unnecessary modules are not operated and user operation is disabled).

(8) In the recovery mode, the OS of the operation device 110 updates the firmware of the operation device 110.

(9) After the firmware is updated, the OS of the operation device 110 restarts with the new firmware of the operation device 110.

In the first procedure, the update of the firmware of the controller 100 and the update of the firmware of the operation device 110 are sequentially performed.

A second procedure for updating the firmware of the controller 100 and updating the firmware of the operation device 110 in parallel is described in the following.

(1) The user instructs the controller 100 to update the firmware. The user may instruct the update through the network from a terminal device such as a PC, or may operate the operation device 110 to instruct the update.

(2) The user copies the compressed file (package) including the firmware of the operation device 110 and the controller 100 to the HDD 112. The user may download the compressed file from the network, or copy from the SD card or the like.

(3) The OS of the controller 100 copies the package, and then decompresses and stores the package in the HDD 112.

(4) After the package is decompressed, the OS of the controller 100 transfers the firmware and application of the operation device 110 from the HDD 112 to the eMMC 120 of the operation device 110.

(5) After the transfer is completed, the OS of the controller 100 notifies the operation device 110 of the start of the update of the controller 100.

(6) The controller 100 updates the firmware.

(7) The operation device 110 starts updating the firmware concurrently with the controller 100 by utilizing redundancy in which a plurality of OS s independently process. The operation device 110 updates the firmware of the operation device 110 by a method of updating the firmware while the operation device 110 is in operation (seamless update method). In other words, the operation device 110 receives operation by the user even while the firmware is being updated.

(8) Furthermore, the OS of the operation device 110 updates the application.

(9) After updating the firmware of the controller 100, the OS of the controller 100 notifies the operation device 110 that the update of the controller 100 is completed.

(10) After the update is completed, the operation device 110 restarts with the new firmware of the operation device 110.

According to the second procedure, the application update of the operation device 110, the firmware update of the operation device 110, and the firmware update of the controller 100 are performed in parallel, and time for update is reduced. Also, the time to restart for shifting to the recovery mode is reduced. As a result, time for updating a plurality of pieces of firmware is rate-determined to the longest time among the firmware of the controller 100, the firmware of the operation device 110, and the application of the operation device 110.

Here, since seamless update is employed in the second procedure, the operation device 110 receives user operation even while updating the firmware or application of the operation device 110 described in steps (6) to (8) of the second procedure. In the first procedure, the operation device 110 shifts to the recovery mode so that unnecessary modules are not operated, and user operation is disabled.

In the second procedure, since the controller 100 is executing step (6) concurrently with steps (7) and (8), the updating of the controller 100 is not completed. In case the user performs an operation (copying, scanning, etc.) using the controller 100 from the operation device 110, the function of the controller is disabled, and unintended problems may occur.

The controller 100 notifies the operation device 110 of the start and end of firmware update by the controller 100. The operation device 110 determines to disable the use of the application using the controller 100 while firmware update is ongoing. In response to receiving the user's input to execute the application, the operation device 110 displays a screen indicating that the application is temporarily unavailable. Further, in response to receiving an update completion notification from the controller 100, the operation device 110 makes all functions available.

The operation device 110 operating as described above, makes available to the user, the functions implemented by the operation device 110 alone, such as confirmation and change of settings of the operation device 110. The user takes full advantage of the seamless update.

As described above, the image forming apparatus 200 of the present embodiment updates the firmware of the controller 100 and the operation device 110 in parallel. Also, during the firmware update of the controller 100, since the user is able to use functions that do not use the controller 100 on the operation device 110, the downtime is reduced during the firmware update.

The "firmware" is a type of software built into information processing apparatuses, electronic devices, and the like, and is a program that implements basic control of internal circuits and devices. The firmware is fixedly installed inside the device and is closely linked to the internal hardware. The word "firm" is used since as a general rule, the content does not change during normal use or operation. The firmware is sometimes referred to as a program for the system because of basic control functions that the firmware have.

The term "while operating the operation device" indicates that the operation device is activated and ready to be operated by the user.

The "downtime" is the time during which the user is restricted from using the information processing apparatus.

Figure 2:
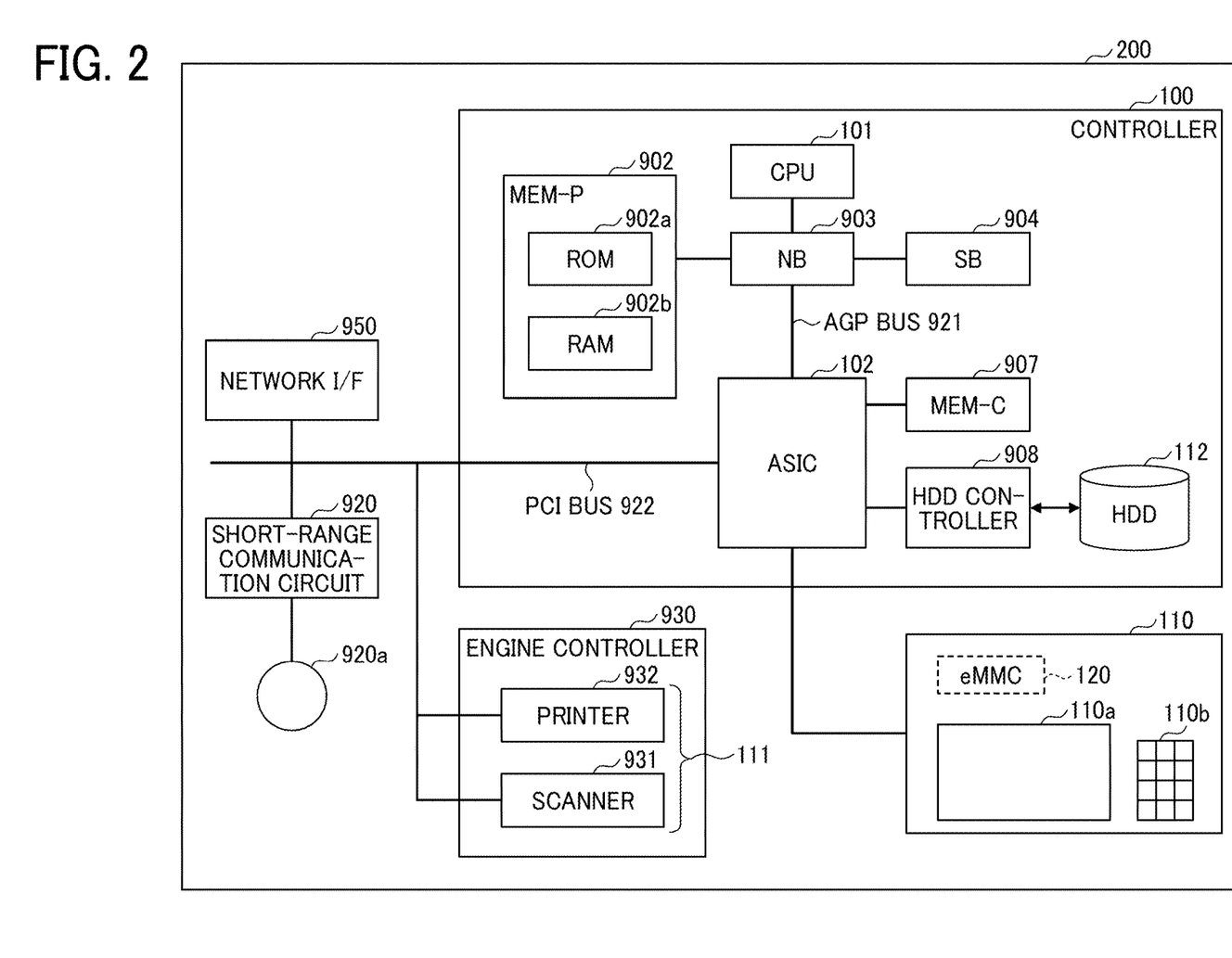
FIG. 2 is a block diagram illustrating a hardware configuration of the image forming apparatus.

FIG. 2 is a block diagram illustrating a hardware configuration of the image forming apparatus 200. The image forming apparatus 200 illustrated in FIG. 2 presents a detailed configuration in addition to the configuration illustrated in FIG. 1. In FIG. 2, some parts of the configuration of FIG. 1 is omitted.

As illustrated in FIG. 2, the image forming apparatus 200 includes the controller 100, a short-range communication circuit 920, an engine controller 930, the operation device 110 and a network I/F 950.

The controller 100 includes the CPU 101 as a main processor, a system memory (MEM-P) 902, a north bridge (NB) 903, a south bridge (SB) 904, the Application Specific Integrated Circuit (ASIC) 102, a local memory (MEM-C) 907 as a storage unit, an HDD controller 908, and the HDD 112 as another storage unit. The NB 903 and the ASIC 102 are connected through an Accelerated Graphics Port (AGP) bus 921.

Among the components described above, the CPU 101 is a control unit that performs overall control of the image forming apparatus 200.

The NB 903 connects the CPU 101 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a read only memory (ROM) 902a as a memory that stores program and data for implementing various functions of the controller 100. The MEM-P 902 further includes a RAM 902b as a memory that deploys the program and data, or as a drawing memory that stores drawing data for printing. The program stored in the ROM 902a may be stored in any computer-readable storage medium, such as a compact disc (CD), digital versatile disc (DVD), or BLU-RAY (registered trademark) in a file format installable or executable by the computer for distribution.

The SB 904 is a bridge for connecting the NB 903 with a peripheral component interconnect (PCI) device or a peripheral device. The ASIC 102 is an integrated circuit (IC) dedicated to an image processing use, and connects the AGP bus 921, a PCI bus 922, the HDD controller 908, and the MEM-C 907 as a bridge. The ASIC 102 includes a PCI target, an AGP master, an arbiter (ARB) as a central processor of the ASIC 102, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 102 may include a USB (Universal Serial Bus) interface or an IEEE 1394 (Institute of Electrical and Electronics Engineers 1394) interface.

The MEM-C 907 is a local memory used as a buffer for image data to be copied or a code buffer. The HDD 112 is a storage that stores image data, font data used during printing, and forms. The HDD controller 908 controls reading or writing of data to and from the HDD 112 under the control of the CPU 101. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

The engine controller 930 includes a scanner 931 and a printer 932. The operation device 110 includes a display panel 110a implemented by, for example, a touch panel that displays current settings or a selection screen and receives a user input and an operation panel 110b including a numeric keypad that receives set values of various image forming parameters such as image density parameter and a start key that accepts an instruction to start copying. The controller 100 controls the entire image forming apparatus 200, and controls, for example, drawing, communication, input from the operation device 110, and the like. The scanner 931 or the printer 932 includes image processing functions such as error diffusion processing and gamma conversion processing.

Note that the image forming apparatus 200 can switch and select a document box function, a copy function, a print function, and a facsimile function in sequence using an application switching key of the operation device 110. In the image forming apparatus 200, a document box mode is selected when the document box function is selected, a copy mode is selected when the copy function is selected, a print mode is selected when the print function is selected, and a facsimile mode is selected when the facsimile function is selected.

The network I/F 950 is an interface for performing data communication using a network. The short-range communication circuit 920 and network I/F 950 are electrically connected to the ASIC 102 through the PCI bus 922.

Figure 3:
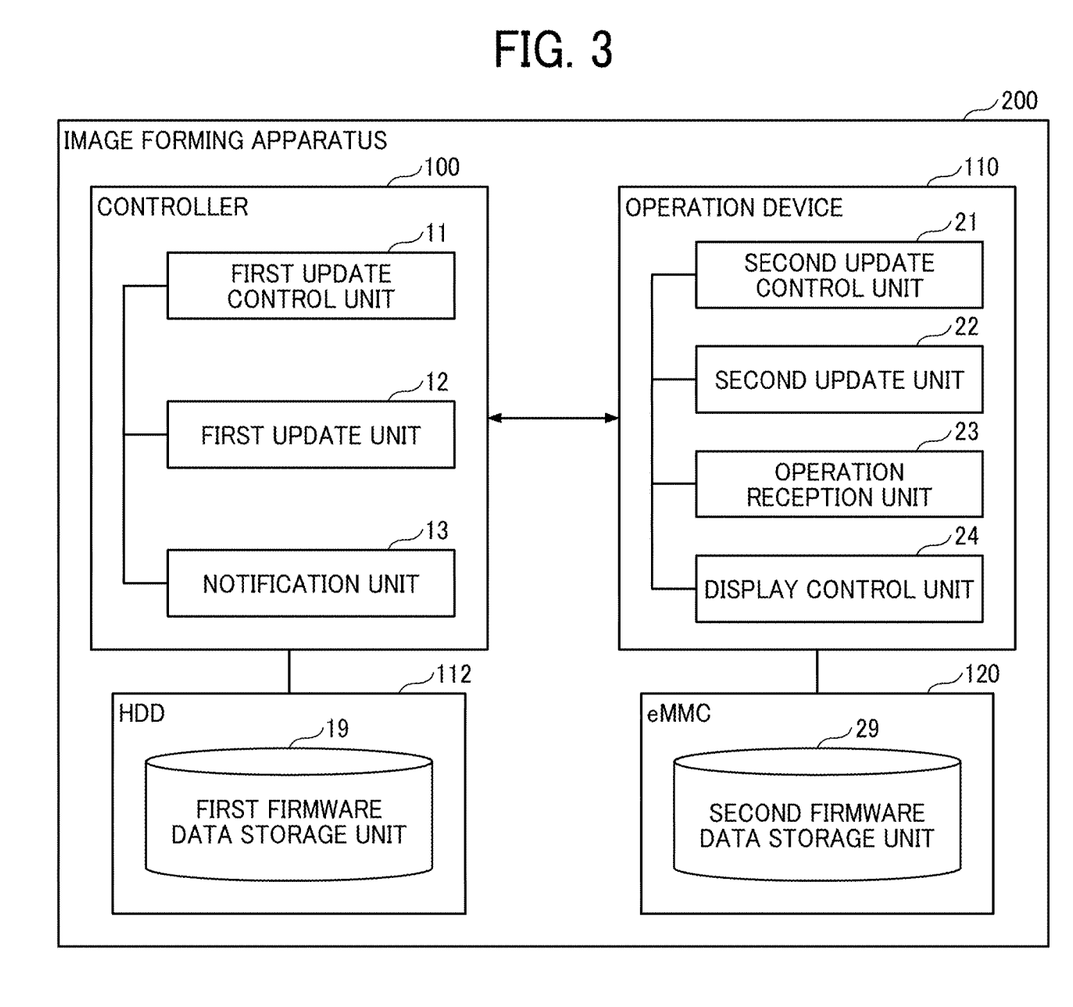
FIG. 3 is a block diagram illustrating an example of a functional configuration of an image forming apparatus related to firmware update.

Hereinafter, a description is given of a functional configuration of the image forming apparatus 200 with reference to FIG. 3. FIG. 3 is an example of a functional block diagram for describing the functions of the image forming apparatus 200 related to firmware update by dividing the functions into blocks.

The controller 100 of the image forming apparatus 200 includes a first update control unit 11, a first update unit 12 and a notification unit 13. Each of these functional units of the controller 100 is implemented by operating any one of the elements illustrated in FIG. 2 according to instructions from the CPU 101 in accordance with the OS or program developed from the HDD 112 to the RAM 902b.

The first update control unit 11 performs a control of the firmware update process on the controller. The "control of the firmware update process" is to update the firmware of the controller 100 and to request the operation device 110 to update the firmware according to the second procedure described above.

The first update unit 12 updates the firmware of the controller 100 using the firmware of the controller 100 stored in the first firmware data storage unit 19.

The notification unit 13 notifies the operation device 110 from the controller 100 when the controller 100 starts updating the controller firmware and when the update is completed.

A first firmware data storage unit 19 is implemented in the HDD 112 of the image forming apparatus 200. The first firmware data storage unit 19 stores the compressed files (referred to as the packages) including the firmware of the operation device 110 (application and firmware) and the controller 100. Since the package is decompressed, the application and firmware of the operation device 110 and the firmware of the controller 100 are stored in the first firmware data storage unit 19. The firmware may be downloaded by the user from the network or copied from the SD card or the like.

The operation device 110 of the image forming apparatus 200 includes a second update control unit 21, a second update unit 22, an operation reception unit 23 and a display control unit 24. Each of these functional units of the operation device 110 is implemented by operating any one of the elements illustrated in FIG. 2 according to instructions from the CPU of the operation device 110 in accordance with the OS or program of the operation device 110 stored in the eMMC 120.

The second update control unit 21 performs control of the firmware update process of the operation device 110. The update process of the operation device 110 is a seamless update process in which the firmware is updated while the operation device 110 is operating. Details are described below with reference to FIG. 4.

The second update unit 22 updates the application and firmware of the operation device 110 using the application (for updating) and firmware of the operation device 110 stored in the second firmware data storage unit 29 (transferred from the controller).

The operation reception unit 23 receives various operations on the operation device 110. In addition, the operation reception unit 23 restricts user operations from the time when the controller 100 receives a notification that updating of the firmware is started until a notification that the update is completed (hereinafter referred to as a restricted period) is received.

The operation reception unit 23 accepts operations that do not use the functions of the controller 100 during the restricted period.

The display control unit 24 displays a message indicating that available functions are limited during the restricted period, the remaining time for update, and the like. Further, when the user inputs to the operation device 110, an operation to use the function of the controller 100 during the restricted period, the display control unit 24 displays that the function is temporarily unavailable.

Also, the second firmware data storage unit 29 is implemented in the eMMC 120 of the operation device 110. The application and firmware of the operation device 110 transferred from the controller 100 are stored in the second firmware data storage unit 29.

Figure 4A:
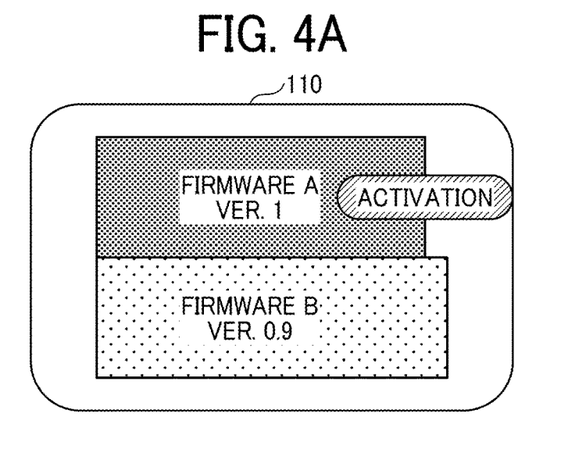
FIGS. 4A, 4B, and 4C are diagrams illustrating a firmware update method of an operation device by a seamless update process.
Figure 4B:
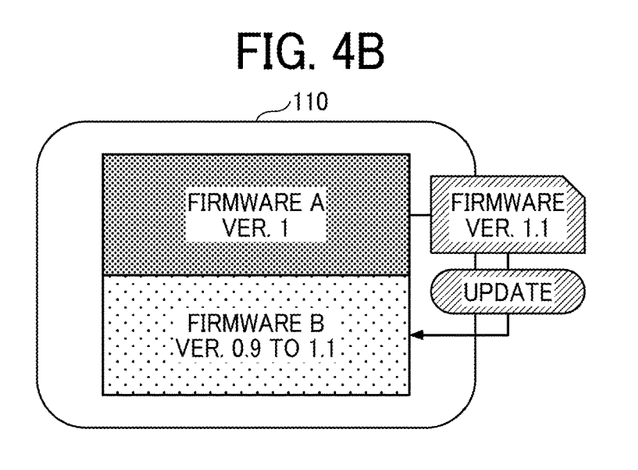
Figure 4C:
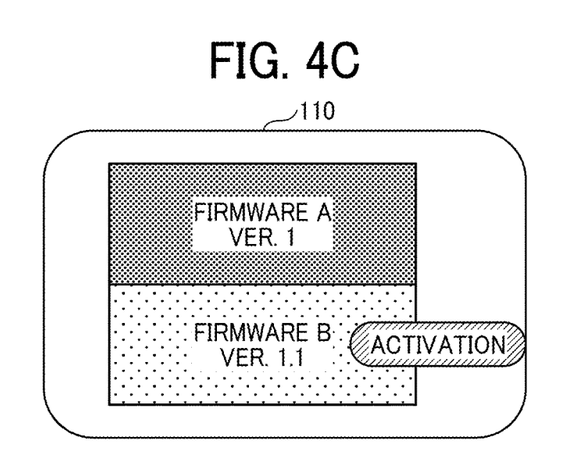

With reference to FIGS. 4A, 4B, and 4C, the seamless update process is described in the following. FIG. 4 is a diagram illustrating a method of updating the firmware of the operation device 110 by the seamless update process.

As illustrated in FIG. 4A, a plurality of pieces of firmware A and B is installed in the operation device 110. The firmware A and B are functionally equivalent, but versions are different. A difference between versions occur naturally with the seamless update process. Although there are two pieces of firmware in FIG. 4A, there may be three or more pieces.

The versions of the firmware A and B before updating are as follows.

Firmware A: Version 1.0
Firmware B: Version 0.9

The seamless update process allows the user to update the firmware of the operation device 110 while the operation device 110 is operable. The operation device 110 activates either one of the two versions A or B of firmware (preferably, the one with the newer version) at startup of the operation device 110. In FIG. 4A, firmware A (an example of first firmware) is activated.

As illustrated in FIG. 4B, when updating the firmware of the operation device 110, the second update unit 22 updates the inactive firmware B (an example of second firmware) in a background. The "background" refers to processing while giving priority to the execution of the application (while ensuring the execution of the application).

Accordingly, the version of the firmware B is updated as follows.

Firmware B: Version 0.9 to 1.1

Then, when the operation device 110 is activated next time, the firmware to be started up is changed to the newer version (last updated) firmware. Since the firmware with the newer version is the firmware B, the operation device 110 activates the firmware B as illustrated in FIG. 4C. The operation device 110 does not activate the firmware A.

As a result, the operation device 110 updates the firmware without downtime. When the firmware of the operation device 110 is updated next time, the firmware A is updated.

Figure 5:
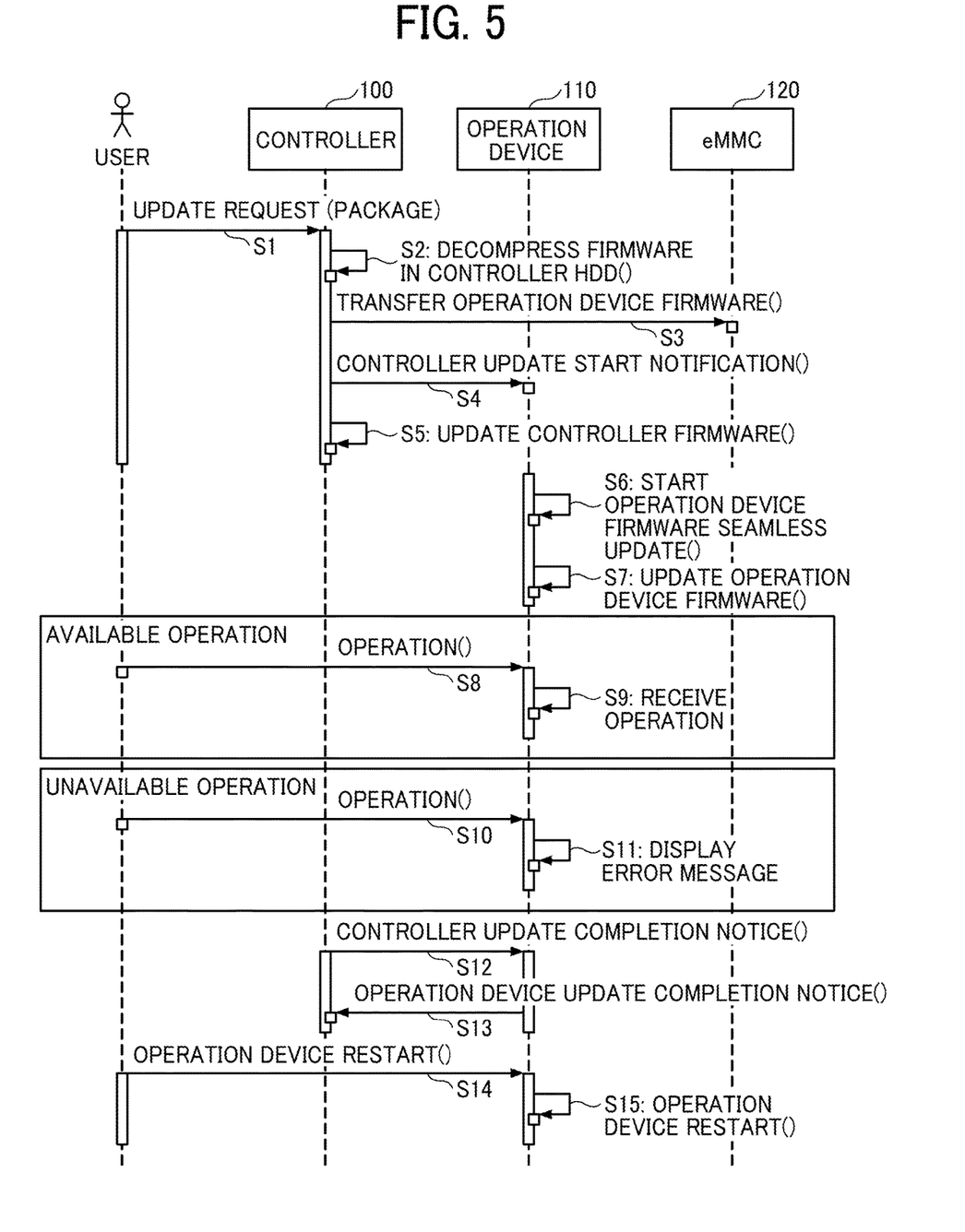
FIG. 5 is a sequence diagram illustrating an example of a process in which a controller and the operation device update firmware concurrently.

With reference to FIG. 5, a process of updating the firmware by the image forming apparatus 200 is described. FIG. 5 is a sequence diagram illustrating a process in which the controller 100 and the operation device 110 update the firmware concurrently.

In step S1, the user instructs the controller 100 to update the firmware. The user may instruct the update through a network from a terminal device such as the PC, or may operate the operation device 110 to instruct the update. FIG. 5 illustrates a case in which instruction is made through the network. The user copies the compressed file including the application and firmware of the operation device 110 and the firmware of the controller 100 to the HDD 112. The compressed file is stored in the first firmware data storage unit 19. The user may download the compressed file from the network, or copy from the SD card or the like.

In step S2 the first update control unit 11 of the controller 100 decompresses and stores the package in the first firmware data storage unit 19.

In step S3, the first update control unit 11 transfers the application and firmware of the operation device 110 to the operation device 110. As a result, the application and firmware of the operation device 110 are stored in the second firmware data storage unit 29 of the eMMC 120.

In step S4, after the transfer is completed, the notification unit 13 of the controller 100 notifies the operation device 110 of a start of the update of the controller 100. In response to receiving the notification, the display control unit 24 of the operation device 110 displays an update banner screen 210, described below with reference to FIG. 6. In response to an update start notification, the second update control unit 21 also starts updating the application and firmware of the operation device 110.

In step S5, after notification, the first update control unit 11 causes the first update unit 12 to update the firmware of the controller 100. The first update unit 12 starts updating old firmware using the firmware of the controller 100 stored in the first firmware data storage unit 19.

In step S6, concurrent with the firmware update by the first update unit 12, the second update control unit 21 of the operation device 110 causes the second update unit 22 to update the firmware while the operation device 110 is kept operating. The second update unit 22 updates the firmware of the operation device 110 according to the seamless update process described above. Accordingly, the first update unit 12 and the second update unit 22 update the firmware concurrently at least part of the time.

In step S7, the second update unit 22 updates the application after completing the firmware update.

In step S8, the user is able to operate the operation device 110 because the operation device 110 is still operating.

In step S9, in response to a user input on the operation device 110 of an operation that can be performed while the controller 100 is updating the firmware, the operation reception unit 23 receives the operation. The operation that can be performed even during firmware update are processes that can be completed by the operation device 110 alone, for example, confirmation and change of settings of the operation device 110. The operation device 110 performs processing according to the received operation.

In step S10, assume that the user operates the operation device 110 similarly.

In step S11, in response to the user input to the operation device 110 of an operation restricted while the firmware of the controller 100 is being updated, the operation reception unit 23 detects the operation but does not accept the operation. The display control unit 24 displays a function restriction notification screen 220, which is described below with reference to FIG. 7. The function restriction notification screen 220 displays an error message indicating that the operation is restricted. The operation that is restricted while the firmware of the controller 100 is being updated is the operation that use the function of the controller 100.

In step S12, in response to a completion of the firmware update by the first update unit 12, the notification unit 13 notifies the operation device 110 that the update of the controller 100 is completed. At this point, the update of the application and the firmware of the operation device 110 may be completed or continued. For convenience of explanation, assume that the time to update the firmware of the operation device 110 and the application is longer than the time to update the firmware of the controller 100.

The display control unit 24 of the operation device 110 that received the update completion notification of the controller 100 ends the display of the update banner screen 210.

In step S13, the second update unit 22 completed updating the firmware and the application of the operation device 110.

The second update control unit 21 notifies completion of updating the firmware and the application of the operation device 110.

Even when the time to update the firmware and application of the operation device 110 is shorter than the time to update the firmware of the controller 100, the second update control unit 21 notifies the completion of updating the firmware and application of the operation device 110 after receiving the notification of the completion of updating the controller 100. This is because the controller 100 whose firmware is being updated is not possible to receive the notification from the operation device 110.

Further, since the update of the firmware and application of the operation device 110 is completed, the display control unit 24 displays an update completion notification screen 230, described below with reference to FIG. 8, to prompt the user to restart the image forming apparatus 200.

In step S14, after confirming that the firmware update of the operation device 110 is completed, the user restarts the operation device 110. In addition to the operation device 110, the user may restart the entire image forming apparatus 200 including the controller 100.

In step S15, the operation device 110 is restarted, and upon restarting, the updated firmware is started. The display control unit 24 displays an update completion restart screen 240 described below with reference to FIG. 9, for notifying the user that the update of the firmware and the application is completed.

Figure 6:
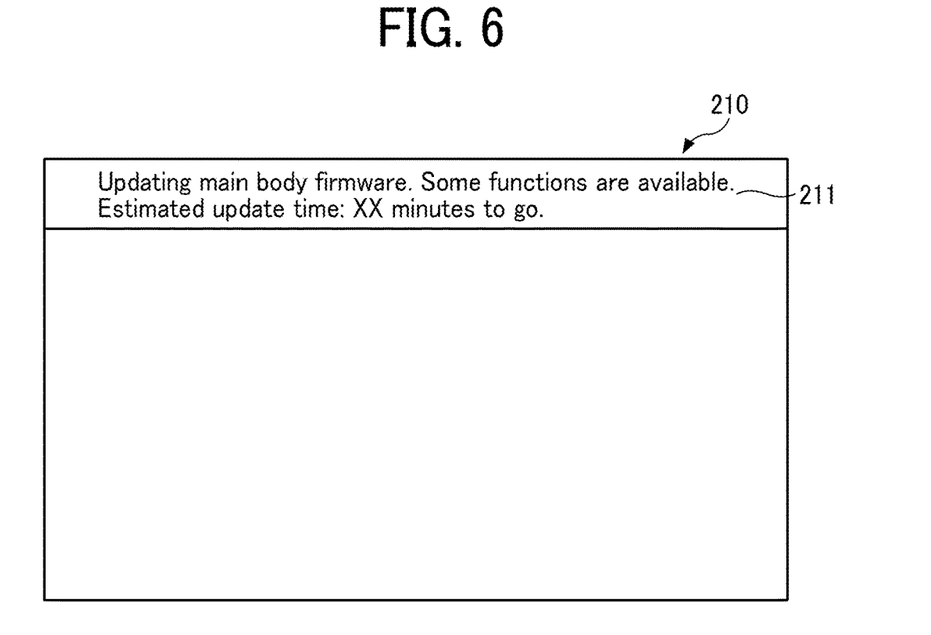
FIG. 6 is a diagram illustrating an example of an update banner screen displayed during firmware update of the controller.

Examples of screens displayed by the operation device 110 regarding the firmware update are described with reference to FIGS. 6 to 9. FIG. 6 is a diagram illustrating an example of the update banner screen 210 displayed during the firmware update in the controller. The display control unit 24 displays the update banner screen 210 in response to the operation device 110 receiving an update start notification from the controller 100 in step S4 of FIG. 5. The update banner screen 210 is displayed at a location difficult to hinder the user's operation, such as the top or bottom of the display panel 110a. A message 211 such as "Updating main body firmware. Some functions are available. Estimated update time: XX minutes to go." is displayed in a form of the banner. From the message 211, the user sees that the firmware of the main body is being updated and that some functions are available. For example, the display control unit 24 may automatically, or in response to a user's operation, display available functions even while the controller 100 is updating the firmware.

Also, the expected update time is the remaining time until the update of the firmware of the controller 100 is completed. The operation device 110 notifies the user of the remaining time since the user is able to use the operation device 110 for the functions that do not use the functions of the controller 100, even while the firmware of the operation device 110 is being updated. The first update control unit 11 is preferred to notify the operation device 110 of the expected update time in step S4. For example, the first update control unit 11 converts the size (number of bytes) of the firmware of the controller 100 into the expected update time and notifies the update time to the operation device 110. The display control unit 24 repeatedly subtracts the elapsed time from the expected update time to update "Estimated update time: XX minutes to go."

Figure 7:
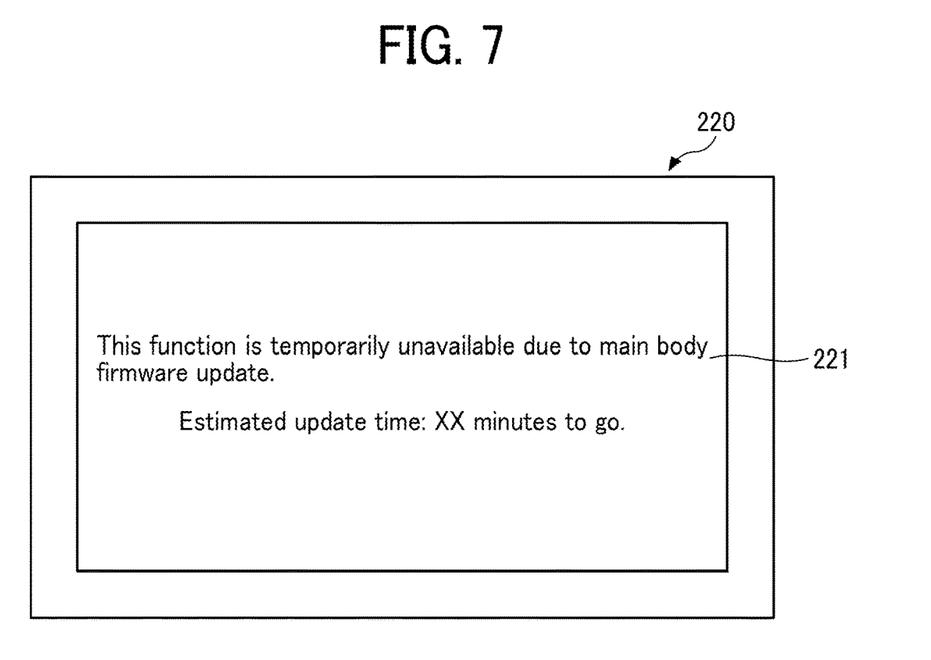
FIG. 7 is a diagram illustrating an example of a function restriction notification screen for notifying limitation of a function displayed by a display control unit in a case a user inputs an operation that is restricted while the firmware of the controller is being updated through the operation device.

FIG. 7 is a diagram illustrating an example of the function restriction notification screen 220 displayed by the display control unit 24 in a case the user inputs through the operation device 110, an operation that is not available while the firmware of the controller 100 is being updated. The function restriction notification screen 220 displays a message 221 such as "This function is temporarily unavailable due to main body firmware update. Estimated update time: XX minutes to go." From the message 221 the user sees that a previously operated function is not available. For example, the display control unit 24 may automatically, or in response to a user's operation, display an available function even while the controller 100 is updating the firmware.

Figure 8:
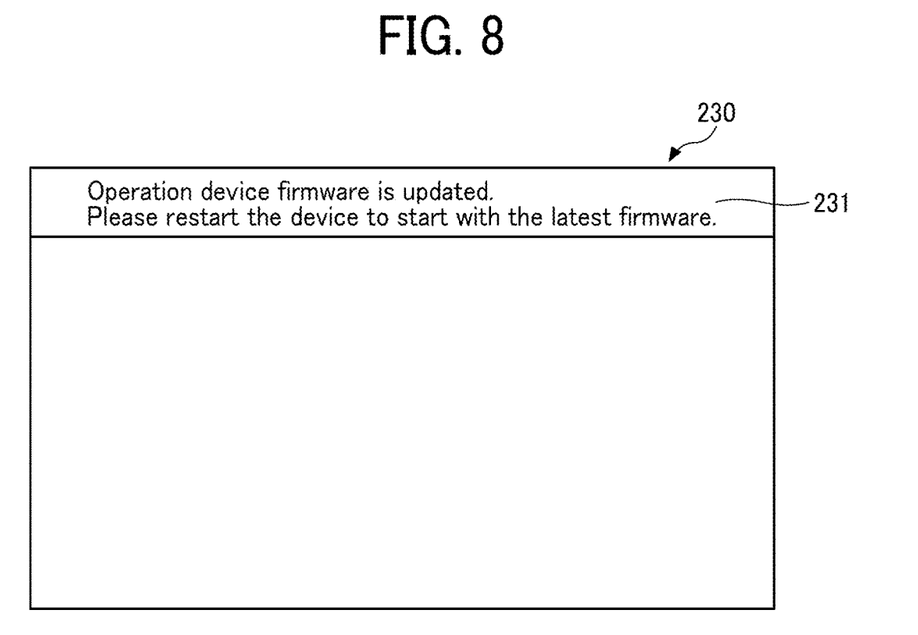
FIG. 8 is a diagram illustrating an example of an update completion notification screen for notifying completion of the firmware update displayed by the display control unit in response to completion of the firmware update of the operation device.

FIG. 8 is a diagram illustrating an example of an update completion notification screen 230 notifying a completion of the firmware update displayed by the display control unit 24 in response to the completion of the firmware update of the operation device 110. The update completion notification screen 230 is displayed at a location difficult to hinder the user's operation, such as the top or bottom of the display panel 110a. A message 231 such as "Operation device firmware is updated. Please restart the device to start with the latest firmware." is displayed in the form of the banner. From the message 231, the user sees that the operation device 110 should be restarted. The restart may be executed by pressing either a reset button of the operation device 110 or turning the power off and on of the operation device 110. Further, the restart may be executed by turning the power off and on of the image forming apparatus 200, or by pressing the reset button of the main body of the image forming apparatus 200.

Figure 9:
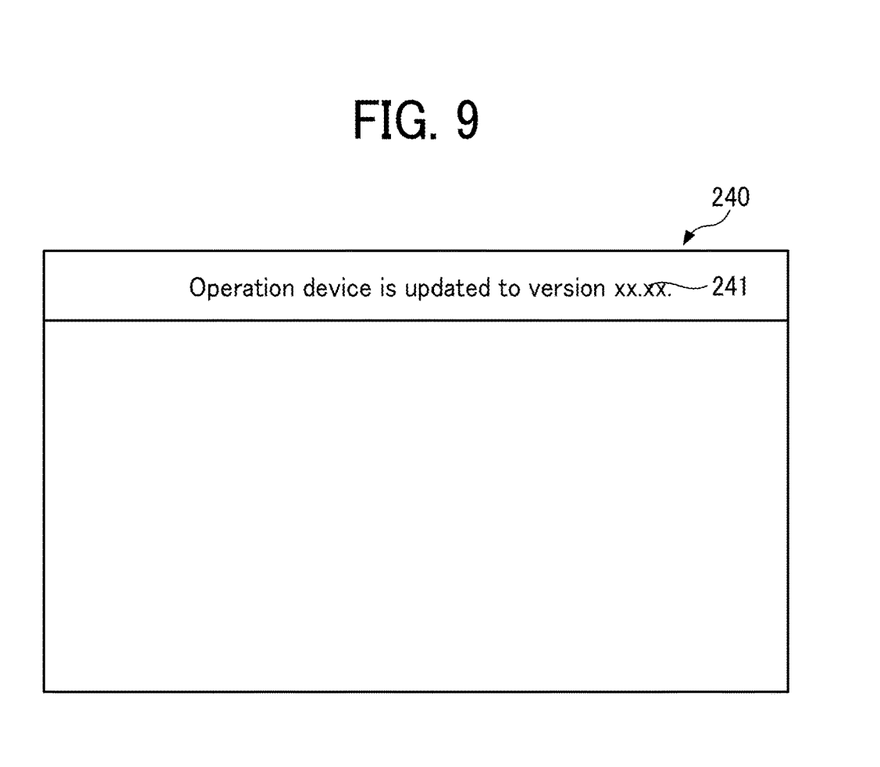
FIG. 9 is a diagram illustrating an example of an update completion restart screen displayed by the display control unit after the operation device is restarted.

FIG. 9 is a diagram illustrating an example of the update completion restart screen 240 displayed by the display control unit 24 after the operation device 110 is restarted. The update completion restart screen 240 is displayed at the location difficult to hinder the user's operation, such as the top or bottom of the display panel 110a. A message 241 such as "Operation device is updated to version xx.xx." is displayed in a form of the banner. From the message 241 the user sees that the firmware of the operation device 110 is updated and the updated version.

Although the version of the firmware of the operation device 110 is displayed in FIG. 9, the version of the firmware of the controller 100 may be displayed in addition.

Figure 10:
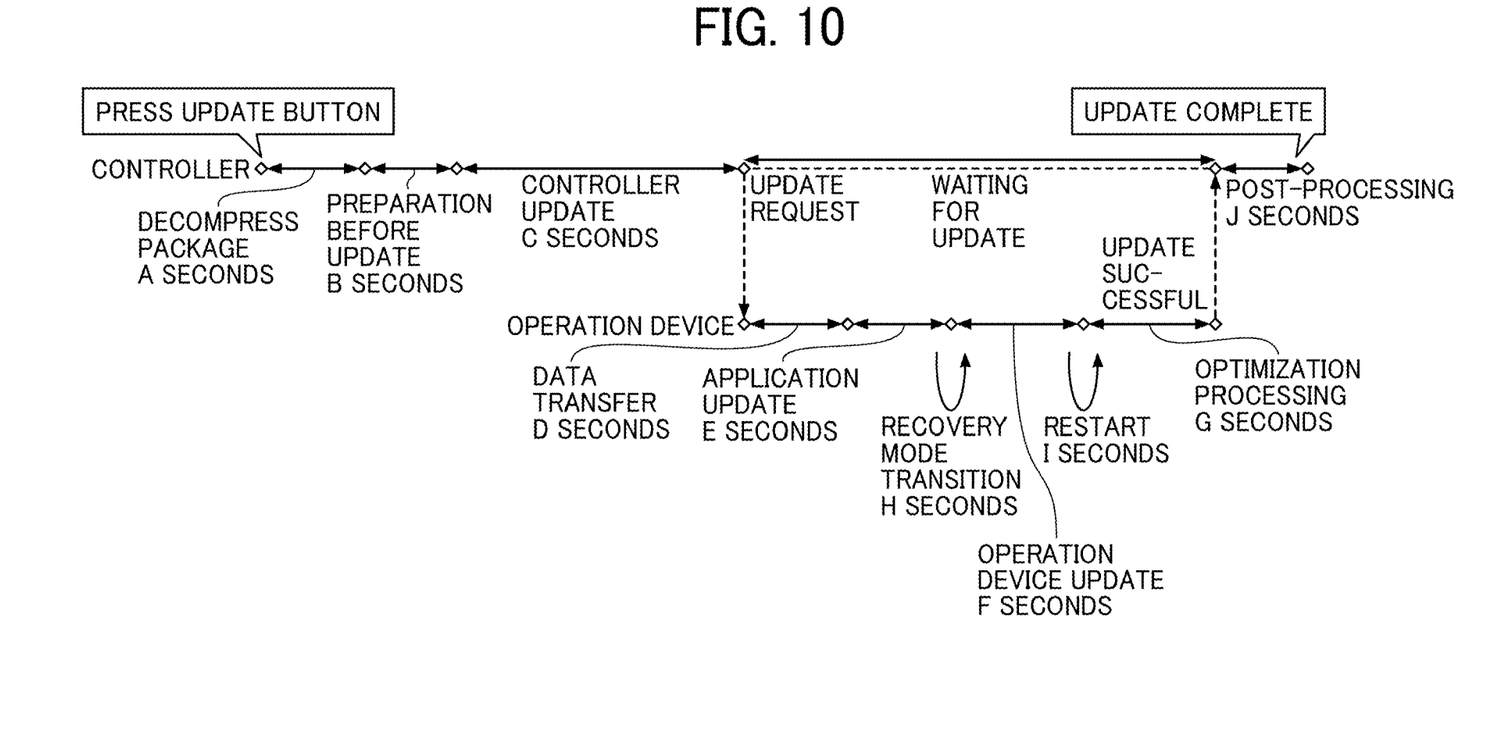
FIG. 10 is a diagram illustrating an example of downtime in a case of a sequential update method employed in a first procedure.

An example of downtime reduction by the firmware update procedure of the present embodiment is described with reference to FIGS. 10 and 11. FIG. 10 is an example of downtime in the case of the sequential update method employed in the first procedure. In FIG. 10, the downtime is the following time from the start of the firmware update.

decompress package: A seconds
preparation before update: B seconds
controller update: C seconds
data transfer: D seconds
application update: E seconds
operation device update: F seconds
optimization processing: G seconds
recovery mode transition: H seconds
restart: I seconds
post-processing: J seconds As illustrated in FIG. 10, after updating the firmware of the controller 100, the firmware of the operation device 110 is updated, and the total downtime is the sum of A second to J second.

Figure 11:
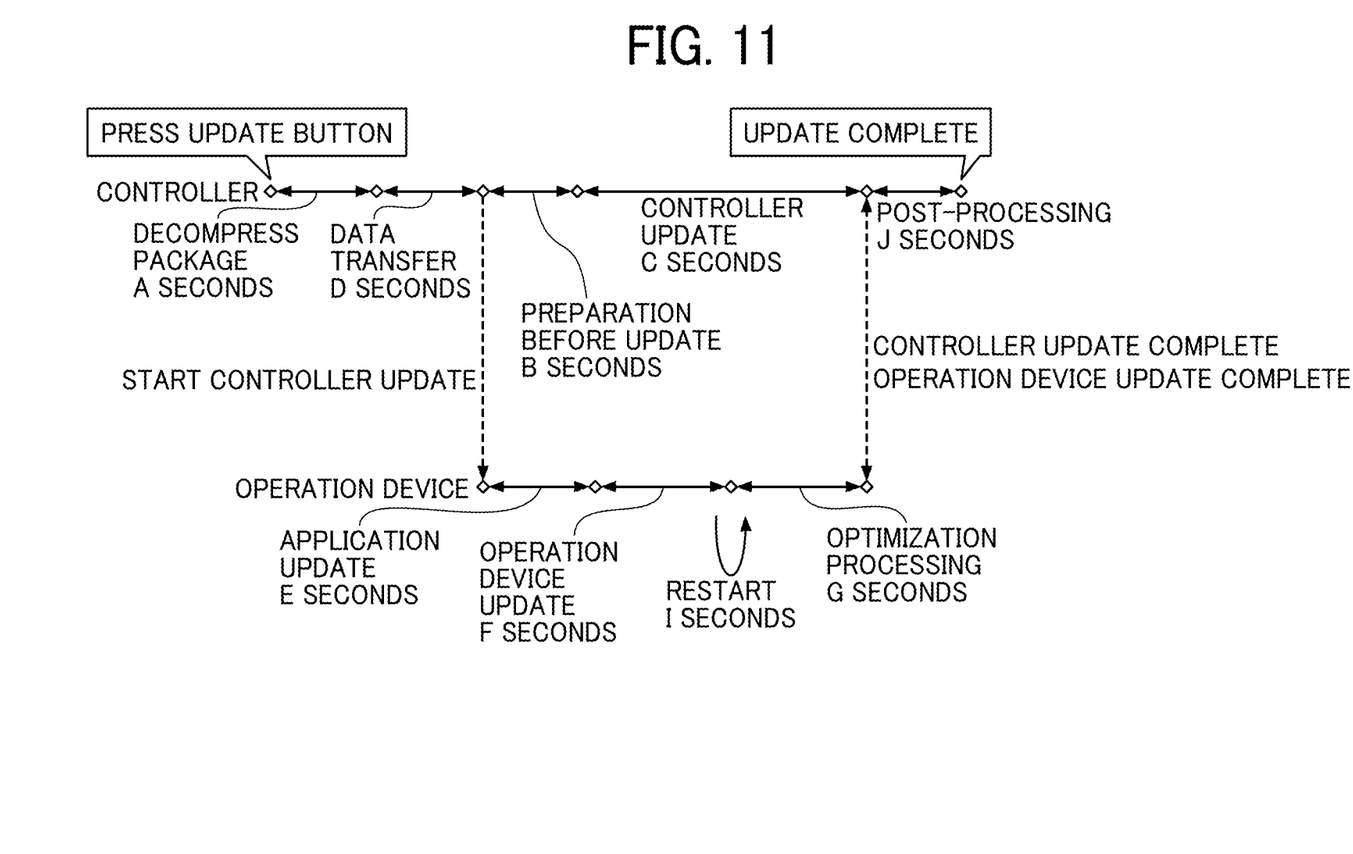
FIG. 11 is a diagram illustrating an example of downtime in a case of the sequential update method employed in a second procedure.

FIG. 11 is a diagram illustrating an example of downtime in a case of the sequential update method employed in the second procedure. The difference from FIG. 10 is that the operation device 110 starts updating the application and firmware after receiving the update start notification from the controller 100 and that there is no recovery mode transition (H seconds).

As illustrated in FIG. 11, the preparation before update taking B seconds and the controller update taking C seconds are performed concurrently with the operation device update, causing the downtime of the second procedure to be shortened by B+C+H seconds compared to the first procedure.

As described above, the image forming apparatus 200 of the present embodiment updates the firmware of the controller 100 and the operation device 110 in parallel. In addition, since the user is able to use the function that does not use the controller 100 while the firmware of the controller 100 is being updated, the user's downtime during the firmware update is reduced.

In the present embodiment, the image forming apparatus is mainly used as one example of the information processing apparatus for updating the firmware, but the information processing apparatus is not limited to the image forming apparatus. The information processing apparatus includes, for example, a projector (PJ), an electronic whiteboard (a whiteboard having an electronic blackboard function), an output device such as a digital signage, a head up display (HUD) device, an industrial machine, an imaging device, a sound collecting device, a medical device, a network appliance, an automobile (connected car), a notebook PC, a mobile phone, a smart phone, a tablet terminal, a game machine, a personal digital assistant (PDA), a digital camera, a wearable PC, a desktop PC, and the like may be used.

For the devices described above, an output may be an output that matches the characteristics of the device, such as content display.

Also, in the present embodiment, the user copies the firmware to the image forming apparatus 200, but the image forming apparatus 200 may automatically download the firmware from the network.

Further, in the present embodiment, the controller 100 transfers the application and firmware to the operation device 110, but the operation device 110 may download the firmware separately from the controller 100 from the network.

Further, the example of configuration illustrated in FIG. 3 and the like are divided according to main functions in order to facilitate understanding of processing by the image forming apparatus 200. The present disclosure is not limited by the method and name of division of processing units. The processing of the image forming apparatus 200 can also be divided into more processing units according to the processing content. Further, one process may be divided to include a larger number of processes.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
a controller; and
an operation device,
the controller including circuitry configured to update firmware of the controller, and
the operation device including circuitry configured to update the firmware of the operation device while the operation device is in operation,
wherein the circuitry of the controller and the circuitry of the operation device update respective firmware concurrently at least a part of time,
wherein the circuitry of the controller is further configured to
notify the operation device of a start of the firmware update of the controller,
wherein the circuitry of the operation device is further configured to, in response to receiving a notification indicating the start of the firmware update of the controller, start the firmware update of the operation device while keeping the operation device in operation, and display that one or more functions are available,
wherein the circuitry of the controller is further configured to:
notify the operation device of a completion of the firmware update of the controller, and
wherein the circuitry of the operation device is further configured to:
detect an operation of a user during a period from a time when a notification indicating the start of the firmware update is received until a time when a notification indicating the completion of the firmware update is received; and
in response to detecting an operation using a function of the one or more functions of the controller, display that the function for which the operation is detected is unavailable.

2. The information processing apparatus of claim 1, wherein
the circuitry of the operation device is further configured to display remaining time for updating the firmware of the controller.

3. The information processing apparatus of claim 1, wherein
the circuitry of the operation device is further configured to in response to a completion of updating the firmware and application of the operation device, display a message indicating that the update is to be completed after restarting the operation device.

4. The information processing apparatus of claim 1, wherein
the circuitry of the operation device is further configured to:
activate one of a first firmware and a second firmware that are pre-installed;
in response to receiving a notification that an update is started while the first firmware is activated, update the second firmware in a background; and
activate the second firmware in response to a restart of the operation device after the second firmware is updated.

5. The information processing apparatus of claim 1, further comprising:
an image forming device configured to form an image processed by the controller.

6. A firmware update method executed by an information processing apparatus including a controller and an operation device, the method comprising:
with the controller, updating firmware of the controller;
with the operation device, updating the firmware of the operation device while the operation device is in operation;
with the controller and the operation device, updating respective firmware concurrently at least a part of time;
with the controller, notifying the operation device of a start of the firmware update of the controller;
with the operation device, in response to receiving a notification indicating the start of the firmware update of the controller, starting the firmware update of the operation device while keeping the operation device in operation, and displaying that one or more functions are available;
with the controller, notifying the operation device of a completion of the firmware update of the controller;
with the operation device, detecting an operation of a user during a period from a time when a notification indicating the start of the firmware update is received until a time when a notification indicating the completion of the firmware update is received; and
with the operation device, in response to detecting an operation using a function of the one or more functions of the controller, displaying that the function for which the operation is detected is unavailable.

* * * * *